United States Patent
Ma et al.

(10) Patent No.: US 9,346,947 B2
(45) Date of Patent: May 24, 2016

(54) HYDROGEN PEROXIDE AS A REACTIVE EXTRUSION ADDITIVE FOR POLY(VINYL BUTYRAL)

(71) Applicant: Solutia Inc., St. Louis, MO (US)

(72) Inventors: Yinong Ma, Longmeadow, MA (US); Wenjie Chen, Amherst, MA (US)

(73) Assignee: Solutia Inc., St. Louis, MO (US)

( * ) Notice: Subject to any disclaimer, the term of this patent is extended or adjusted under 35 U.S.C. 154(b) by 176 days.

(21) Appl. No.: 14/180,911

(22) Filed: Feb. 14, 2014

(65) Prior Publication Data

US 2014/0275390 A1    Sep. 18, 2014

Related U.S. Application Data

(60) Provisional application No. 61/785,409, filed on Mar. 14, 2013.

(51) Int. Cl.

| | |
|---|---|
| *C08K 5/10* | (2006.01) |
| *C08L 29/04* | (2006.01) |
| *C08L 29/14* | (2006.01) |
| *B32B 17/10* | (2006.01) |
| *C08J 5/18* | (2006.01) |

(52) U.S. Cl.
CPC ............ *C08L 29/14* (2013.01); *B32B 17/10761* (2013.01); *C08J 5/18* (2013.01); *B32B 2457/12* (2013.01); *C08J 2329/14* (2013.01)

(58) Field of Classification Search
CPC ....... B32B 17/10761; C08K 5/14; C08J 5/18; C08L 29/14
See application file for complete search history.

(56) References Cited

U.S. PATENT DOCUMENTS

| | | | |
|---|---|---|---|
| 2,282,026 | A | 5/1942 | Bren et al. |
| 2,282,057 | A | 5/1942 | Hopkins et al. |
| 4,654,179 | A | 3/1987 | Cartier et al. |
| 5,137,954 | A | 8/1992 | DasGupta et al. |
| 5,595,818 | A | 1/1997 | Hopfe et al. |
| 5,728,472 | A | 3/1998 | D'Errico |
| 6,093,471 | A | 7/2000 | Hopfe et al. |
| 6,825,255 | B2 | 11/2004 | Yuan et al. |
| 2008/0053516 | A1 | 3/2008 | Hayes |
| 2013/0197154 | A1 | 8/2013 | Yamaguchi et al. |

FOREIGN PATENT DOCUMENTS

| | | |
|---|---|---|
| GB | 594001 A | 10/1947 |
| JP | H09110930 A | 4/1997 |
| JP | 2002023298 A | 1/2002 |
| JP | 2007269881 A | 10/2007 |

OTHER PUBLICATIONS

Wade, Vinyl Acetal Polymers, in Encyclopedia of Polymer Science & Technology, 3rd edition, vol. 8, pp. 381-399 (2003).
PCT International Search Report and Written Opinion dated Jun. 2, 2014 for International Application No. PCT/US2014/020134.

*Primary Examiner* — Marie Reddick

(57) ABSTRACT

A poly(vinyl butyral) (PVB) resin formulation, a method of extruding PVB resins, and related materials and products that provide for PVB sheets with a selectable flow (or melt viscosity) by melt blending hydrogen peroxide ($H_2O_2$) into a PVB resin composition is described herein.

15 Claims, 2 Drawing Sheets

HYDROGEN PEROXIDE AS A REACTIVE EXTRUSION ADDITIVE FOR POLY(VINYL BUTYRAL)

CROSS REFERENCE TO RELATED APPLICATION(S)

This Application claims the benefit of U.S. Provisional Patent Application Ser. No. 61/785,409, filed Mar. 14, 2013, the entire disclosure of which is incorporated by reference herein.

BACKGROUND OF THE INVENTION

1. Field of the Invention

The present invention is in the field of poly(vinyl butyral) (PVB) interlayers. Specifically, the present invention relates to the formulation of a PVB sheet where the melt viscosity may be controlled through the use of hydrogen peroxide ($H_2O_2$) included as part of the melt blend of PVB resin.

2. Description of Related Art

Generally, multiple layer glass panels refer to a laminate comprised of a polymer sheet or interlayer sandwiched between two panes of glass. The laminated multiple layer glass panels are commonly utilized in architectural window applications, in the windows of motor vehicles and airplanes, and in photovoltaic solar panels. The first two applications are commonly referred to as laminated safety glass. The main function of the interlayer in the laminated safety glass is to absorb energy resulting from impact or force applied to the glass, keep the layers of glass bonded even when the force is applied and the glass is broken, and prevent the glass from breaking up into sharp pieces. Additionally, the interlayer generally gives the glass a much higher sound insulation rating, reduces UV and/or IR light transmission, and enhances the aesthetic appeal of the associated window. In regards to the photovoltaic applications, the main function of the interlayer is to encapsulate the photovoltaic solar panels which are used to generate and supply electricity in commercial and residential applications.

The interlayer is generally produced by mixing a polymer resin such as poly(vinyl butyral) (PVB) with one or more plasticizers and melt blending or melt processing the mix into a sheet by any applicable process or method known to one of skill in the art, including, but not limited to, extrusion. Other additional additives may optionally be added for various other purposes. After the interlayer sheet is formed, it is typically collected and rolled for transportation and storage and for later use in the multiple layer glass panel, as described below.

The following offers a simplified description of the manner in which multiple layer glass panels are generally produced in combination with the interlayers. First, at least one polymer interlayer sheet is placed between two substrates and any excess interlayer is trimmed from the edges, creating an assembly. It is not uncommon for multiple polymer interlayer sheets to be placed within the two substrates creating a multiple layer glass panel with multiple polymer interlayers. Then, air is removed from the assembly by an applicable process or method known to one of skill in the art; e.g., through nip rollers, vacuum bag, vacuum ring, or another deairing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process known to one of ordinary skill in the art such as, but not limited to, autoclaving.

Generally, two (2) common problems are encountered in the art of manufacturing multiple layer glass panels: delamination and bubbling from inefficient de-airing or de-gassing. Delamination is the splitting or separating of the laminate into the individual layers, e.g., the separating of the substrates from the interlayer. This typically occurs around the edges of the multiple layer glass and is usually the result of the breakdown of the bond between the glass and the interlayer by atmospheric moisture attack, panel sealant degradation and/or excessive stress imposed on the glass. Certain conditions tend to accelerate the manifestation of edge delamination, especially when one or more of the substrates is wavy or warped. If the delamination extends too far into the panel, the structural integrity of the glass panel may become compromised.

De-airing or de-gassing is the removal of the presence of gas or air in a multiple layer glass panel. Gas trapped in a multiple layer glass panel can have a negative or degenerative effect on the optical clarity and adhesion of the panel. During the manufacturing process of laminated multiple layer glass panel constructs, gases can become trapped in the interstitial spaces between the substrates and the one or more polymer interlayers. Generally, this trapped air is removed in the glazing or panel manufacturing process by vacuum de-airing the construct, nipping the assembly between a pair of rollers or by some other method known to those of skill in the art. However, these technologies are not always effective in removing all of the air trapped in the interstitial spaces between the substrates, especially when one or more of the substrates is wavy or warped. Generally, the presence of a gas in the interstitial spaces of a multiple layer glass panel takes the form of bubbles in the polymer interlayer sheet(s) or pockets of gas between the polymer interlayer sheet(s) and the substrates—known as "bubbling".

Delamination, bubbling and visual defects are particularly evident and acute when the interlayer is used in conjunction with warped or wavy glass or other applications where high flow (or low flow) may be important, including, but not limited to, tempered glass, heat strengthened/toughened glass, mismatched glass, bent glass for making windshields, and in photovoltaic applications where additional components are included that cause unevenness. For example, the processing of tempering glass creates some distortion and roller waves, and thus tempered glass is generally not as flat as ordinary annealed glass. In such applications, the waviness of the substrates creates gaps between the substrates themselves and between the substrates and the interlayer(s), resulting in an increased tendency of delamination and bubble formation. Delamination and bubble formation, or any other form of visual imperfection, are undesirable and problematic where the end-product multiple layer glass panel will be used in an application where optical quality or structural integrity is important. Thus, the creation of a near perfect laminated glass essentially free of any gaseous pockets or bubbles is paramount in the multiple layer glass panel manufacturing process. Not only is it important to create a multiple layer glass panel free of gaseous pockets and bubbles immediately after manufacturing, but permanency is also important. It is not an uncommon defect in the art of multiple layer glass panels for dissolved gases to appear (e.g., for bubbles to form) in the panel over time, especially at elevated temperatures and under certain weather conditions and sunlight exposure. More gases or excessive air will be trapped in the laminated panels if glass panels are warped and/or wavy. The excessive air trapped in the laminated panels will significantly reduce the tolerance of the panels for the elevated temperatures and adverse weather conditions, i.e., bubbles could be formed at lower temperatures. Thus, it is also important that, in addition to leaving the laminate production line free from any bubbles or gaseous cavities, the multiple layer glass panel remains gas-free for a substantial period of time under end-use conditions to fulfill its commercial role.

As a measure to prevent delamination, bubbling and other visual defects with warped glass, it has become common to either increase the flowability, the thickness, or both characteristics in the interlayer. This increases the capability of the interlayer to fill the gaps that are inherent in the use of warped glass substrates. However, there are several problems with these interlayer compositions previously utilized in the art. For example, with an increase in thickness comes an increase in cost. Additionally, increasing flow also often requires additional expense. One can increase the amount of plasticizer loading or can use a lower molecular weight PVB. Plasticizer loading creates other problems including plasticizer exudation and creep.

The surface roughness (characterized as Rz) of a sheet of PVB is generally known to those of skill in the art as the measure of the finer surface irregularities in the texture of the interlayer surface, i.e., peaks and spaces there between on the surface distinguished from the imaginary plane of the flattened polymer interlayer sheet. An appropriate level of surface roughness is needed for good de-airing performance during lamination. If the surface roughness is too low, de-airing will become impossible. On the other hand, if the surface roughness is too high, the large surface irregularities in the interlayer will be difficult to remove during lamination, resulting in the surface irregularities being visible. Either too low or too high surface roughness will result in poor de-airing performance and cause more bubbling, delamination and/or visual defects.

The degree of surface roughness is at least in part the result of the manufacturing process employed to create the interlayer. Generally, there are two ways to generate surface roughness during manufacturing: by forming "random rough" surfaces through melt fracture during extrusion (see, for example, U.S. Pat. Nos. 5,595,818 and 4,654,179, the entire disclosures of which are incorporated by reference herein), or by imparting a surface on the interlayer sheet by embossing (see, for example, U.S. Pat. No. 6,093,471, the entire disclosure of which is incorporated by reference herein). Surfaces formed by both methods (that is, both random rough and embossed surfaces) will be affected by the rheological properties (such as flow) of the interlayer. For example, an increase in flow may result in a decrease in the surface roughness formed by melt fracture during extrusion (that is, the surface roughness, Rz, may be too low, which will make de-airing more difficult, causing more bubbling, delamination or other visual defects). Again, such defects are undesirable and can result in visual and structural defects as well as decreased mechanical strength of the interlayer and the resultant multiple layer glass panel. In some extreme cases, surface roughness formed by melt fracture will be extremely low (or the sheet will be very smooth) due to the formulation changes for improving flow because there will be no 'fracturing' of the polymer melt to cause the surface irregularities. In such cases where there is very low or no surface roughness level, or even where increased surface roughness is desired (surface roughness levels higher than the surface roughness levels formed by melt fracture), embossing techniques have to be employed to produce a surface having a sufficient surface roughness, Rz (such as at least 25 μm, or at least 30 μm, or greater than 30 μm). The embossing process requires additional manufacturing steps and may be a more complicated process, and the end result may be lower efficiency, increased energy costs, and loss of production capacity.

Creep is the tendency of the solid interlayer material to slowly move or deform permanently under the influence of stresses causing the two layers of glass to move relative to each other. Creep can be problematic because multiple layer glass panels tend to become deformed and elongated as a result of the interlayer creep. For example, over time the two glass panels may begin to slide apart from one another as a result of the interlayer creep. Thus, with many previous attempts at increasing flow came a greater tendency for creep and the resultant deformation of the interlayer. In some situations, this creep can result in structural defects and decreased mechanical strength of the interlayer and the resultant multiple layer glass panel.

While an increase in flow can be achieved by using a PVB resin which has a lower molecular weight (Mw) to begin with to form the PVB interlayer or sheet, this solution presents a host of different problems. First, before the PVB resin is formed into a PVB sheet to be used as an interlayer, the lower molecular weight of the PVB resin can make the manufacturing process significantly more difficult due to handling issues with the lower molecular weight PVB resin.

Further, in order to generate lower molecular weight PVB resin, different starting materials generally had to be used. For example, poly(vinyl alcohol) (PVOH) grades having differing molecular weights and mixtures of resins previously had to be used to make the PVB resin having a particular target molecular weight. This process can be difficult and time consuming. Further, a particular molecular weight formulation (starting PVOH) would always have a fixed flowability in the resultant PVB sheet. Thus, suppliers of PVB sheets would be required to stock a variety of different molecular weights of PVOH in order to make a variety of PVB resins (having different molecular weights) that they, in turn, would need to provide a variety of different formulations of PVB sheet depending on what a customer needed.

This latter problem is particularly important. While it was previously possible to provide PVB resins with a variety of different molecular weights (and thus PVB sheets with various levels of flowability), the range of such products was limited by the available range of inputs. Thus, if a manufacturer was limited in the number of PVOH grades (different molecular weights) they had available, they were limited in the number of PVB resin formulations they could supply, and, thus, the available flowability options for the resultant PVB sheet based on the types of PVOH available and the acceptable and available plasticizer load. It should be recognized that while the present disclosure discusses the usefulness of higher flow PVB, in other situations lower flow PVB formulation are desired and, therefore, it is desirable in the art to be able to produce a PVB sheet having particular flow characteristics (such as high flow or low flow), not just to produce sheets with higher flow and/or the lowest melt viscosity available. Stated differently, it is desirable to be able to vary the flow and molecular weight of PVB resin to be able to produce PVB sheet having different physical properties as desired or needed.

Summarized, visual defects such as bubbling and delamination, as well as other defects, are common problems in the field of multiple layer glass panels which are particularly acute when using wavy or warped substrates. In an attempt to correct these problems associated with wavy or warped substrates, it became common to use an interlayer with an increased thickness or flow or both. However, increased thickness and/or flow of previously utilized interlayers created a host of new problems and unfavorable sacrifices, including, but not limited to, increased manufacturing costs (i.e., the costs associated with an increased thickness in the interlayer) and the requirement to utilize different PVOH starting materials to generate lower molecular weight PVB resins that could be used to control the physical properties of the PVB sheet.

SUMMARY OF THE INVENTION

Because of these and other problems in the art, described herein is a poly(vinyl butyral) (PVB) resin formulation, a method of extruding PVB resins, and related materials and products that provide for PVB sheets with a selectable flow (or melt viscosity) by melt blending hydrogen peroxide ($H_2O_2$) into a PVB resin composition. Described herein, among other things is a method for making a poly(vinyl butyral) sheet, the method comprising: providing a first poly (vinyl butyral) resin in a first amount; providing a first plasticizer in a second amount; melt blending said first amount of said first poly(vinyl butyral) resin with said second amount of said first plasticizer and a third amount of a hydrogen peroxide to create a poly(vinyl butyral) melt blend; and extruding said poly(vinyl butyral) melt blend into a poly(vinyl butyral) sheet; wherein said poly(vinyl butyral) sheet has a lower melt viscosity compared to a poly(vinyl butyral) sheet formed by melt blending said first amount of said first poly(vinyl butyral) resin with said second amount of said first plasticizer without any hydrogen peroxide. In an embodiment, the method further comprises adding a second poly(vinyl butyral) resin to said melt blend in a fourth amount. In an embodiment, the third amount comprises about 0.1 to about 3 parts per hundred weight resin, or about 0.5 to about 2.5 parts per hundred weight resin, or about 1 to about 2 parts per hundred weight resin.

Also described herein is a poly(vinyl butyral) melt blend comprising: a poly(vinyl butyral) resin; a plasticizer; and hydrogen peroxide. In an embodiment, the poly(vinyl butyral) melt blend is extruded to form a poly(vinyl butyral) sheet. In an embodiment, the melt blend comprises about 0.1 to about 3 parts per hundred weight resin of hydrogen peroxide, or about 0.5 to about 2.5 parts per hundred weight resin of hydrogen peroxide, or about 1 to about 2 parts per hundred weight resin of hydrogen peroxide.

Also described herein is a poly(vinyl butyral) sheet produced by the following method: providing a first poly(vinyl butyral) resin in a first amount; providing a first plasticizer in a second amount; melt blending said first amount of said first poly(vinyl butyral) resin with said second amount of said first plasticizer and a third amount of a hydrogen peroxide to create a poly(vinyl butyral) melt blend; and extruding said poly(vinyl butyral) melt blend into a poly(vinyl butyral) sheet. In an embodiment, the amount of hydrogen peroxide is from about 0.1 to about 3 parts per hundred weight resin, or from about 0.5 to about 2.5 parts per hundred weight resin, or from about 1 to about 2 parts per hundred weight resin. In an embodiment, the poly(vinyl butyral) melt blend consists essentially of poly(vinyl butyral) resin, plasticizer and hydrogen peroxide.

DETAILED DESCRIPTION OF PREFERRED EMBODIMENT(S)

Figure 1:
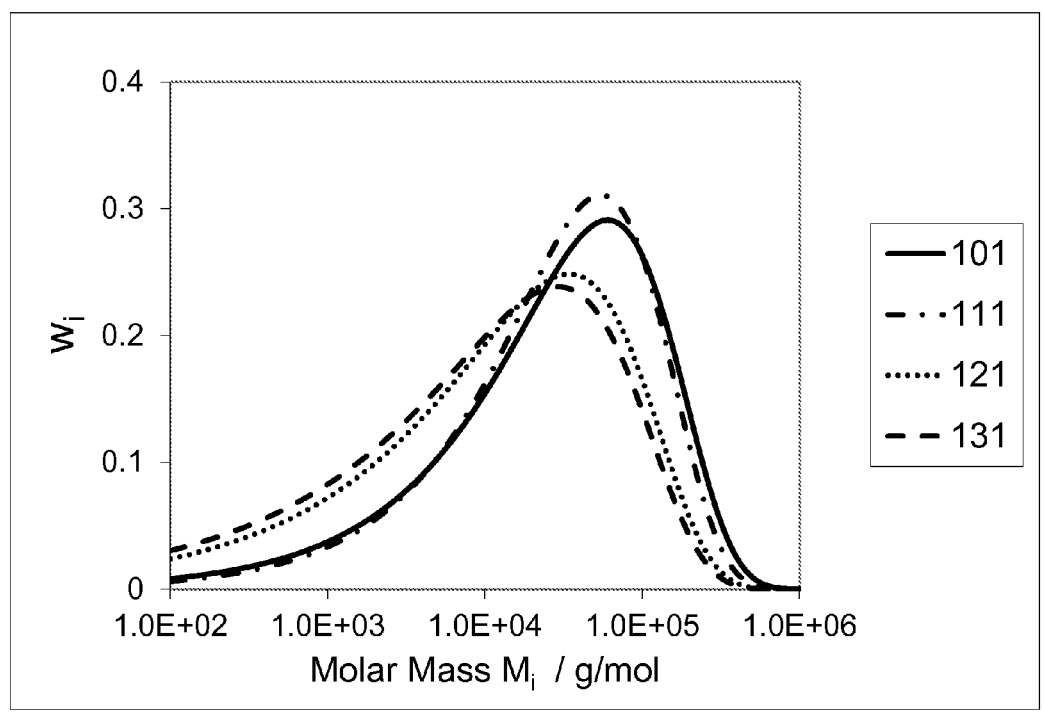
FIG. 1 is a graph showing the molecular weight distribution of four different PVB formulations.

The terms "polymer interlayer sheet," "interlayer," and "polymer melt sheet" as used herein, generally may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet.

In various embodiments of the present disclosure, a multi-layered interlayer comprises at least two polymer layers (e.g., a single layer or multiple layers co-extruded) disposed in direct contact with each other, wherein each layer comprises a polymer resin, as detailed more fully below. As used herein, "skin layer" generally refers to outer layers of the interlayer and "core layer" generally refers to the inner layer(s). Thus, one exemplary multilayer embodiment would be: skin layer//core layer//skin layer. It should be noted, however, further embodiments include interlayers having more than three layers (e.g., 4, 5, 6, or up to 10 or more individual layers). Additionally, any multilayered interlayer utilized can be varied by manipulating the composition, thickness, or positioning of the layers and the like. For example, in one tri-layer polymer interlayer sheet, the two skin or outer layers may comprise one PVB resin, while the middle layer may comprise the same or different PVB resin or different thermoplastic material, or the like. Thus, it is contemplated that the skin layers and the core layer(s) of the multilayered interlayer sheets may be comprised of the same thermoplastic material or different thermoplastic materials and the same or different plasticizer(s).

In order to facilitate a more comprehensive understanding of the high flow interlayer disclosed herein, a summary of common components found in an interlayer, both generally and in interlayers of the present disclosure, and the formation thereof, will be discussed.

The PVB resin is produced by known aqueous or solvent acetalization processes reacting PVOH with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399 (2003), the entire disclosures of which are incorporated herein by reference. The resin is commercially available in various forms, for example, as Butvar® Resin from Solutia Inc., a subsidiary of Eastman Chemical Company.

As used herein, residual hydroxyl content (calculated as PVOH) refers to the amount of hydroxyl groups remaining on the polymer chains after processing is complete. For example, PVB can be manufactured by hydrolyzing poly(vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the PVB resin comprises about 9 to about 35 weight percent (wt. %) hydroxyl groups calculated as PVOH, about 13 to about 30 wt. %, about 9 to about 22 wt. %, or about 15 to about 22 wt. %; and most preferably, for certain embodiments, about 17.75 to about 19.85 wt. % hydroxyl groups calculated as PVOH. The resin can also comprise less than 15 wt. % residual ester groups, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference).

Notably, for a given type of plasticizer, the compatibility of the plasticizer in the polymer is largely determined by the hydroxyl content of the polymer. Polymers with greater residual hydroxyl content are typically correlated with reduced plasticizer compatibility or capacity. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers.

Conventional PVB resin for the typical industrial PVB interlayer generally has a molecular weight ($M_w$) of greater than about 180,000, preferably about 185,000 to about 250,000 Daltons, as measured by size exclusion chromatography using low angle laser light scattering. As used herein, the term "molecular weight" means the weight average molecular weight ($M_w$). In the PVB interlayers of the present disclosure, PVB resin with any starting molecular weight(s) can be used, as desired.

Various adhesion control agents ("ACAs") can be used in the interlayers of the present disclosure. ACAs in the interlayer formulation control adhesion of the sheet to glass to provide energy absorption on impact of the glass laminate. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

Anti-blocking agents may also be added to the interlayer of the present invention to reduce the level of blocking of the interlayer. Anti-blocking agents are known in the art, and any anti-blocking agent that does not adversely affect the properties of the interlayer may be used. A particularly preferred anti-blocking agent that can be successfully used as in the polymer sheet while not affecting optical properties of the sheet or the adhesive properties of the sheet to glass is a fatty acid amide (see, for example, U.S. Pat. No. 6,825,255, the entire disclosure of which is incorporated herein).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

The interlayers of the present disclosure comprise at least one plasticizer. In various embodiments of interlayers of the present disclosure, the interlayer can comprise 5 to about 80, about 10 to about 75, about 15 to about 60, about 25 to about 50, about 15 to about 50, about 10 to about 40, about 15 to about 40, about 25 to about 38, about 29 to about 32, and about 30 phr (parts per hundred parts resin), or about 32 phr, or about 33 phr, or about 34 phr, or about 35 phr, or about 36 phr, or about 37 phr, or about 38 phr, or about 39 phr, or about 40 phr of at least one plasticizer. Of course, other quantities can be used as is appropriate for the particular application.

In some embodiments, the plasticizer has a hydrocarbon segment of fewer than 20, fewer than 15, fewer than 12, or fewer than 10 carbon atoms. Suitable conventional plasticizers for use in these interlayers include esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, and mixtures thereof. A more preferred plasticizer is 3GEH.

Additionally, other plasticizers, such as high refractive index plasticizers, may also be used in the interlayer of the multiple layer laminate glass panels, either alone or in combination with another plasticizer. Examples of the high refractive index plasticizers include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. Examples of more preferred high refractive index plasticizers are dipropylene glycol dibenzoates and tripropylene glycol dibenzoates.

As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the melt that was used to produce the interlayer.

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$) values. The glass transition temperature ($T_g$) is the temperature that marks the transition from the glassy state of the interlayer to the elastic state. In general, higher amounts of plasticizer loading will result in lower $T_g$. Conventional, previously utilized interlayers generally have had a $T_g$ in the range of about 0° C. for acoustic (noise reducing) interlayer to about 45° C. for hurricane and aircraft interlayer applications.

An interlayer's glass transition temperature is also correlated with the stiffness of the interlayer—the higher the glass transition temperature, the stiffer the interlayer. Generally, an interlayer with a glass transition temperature of 30° C. or higher increases laminated glass strength and torsional rigidity. A softer interlayer (generally characterized by an interlayer with a glass transition temperature of lower than 30° C.), on the other hand, contributes to the sound dampening effect (i.e., the acoustic characteristics).

Generally, in its most basic sense, extrusion is a process used to create objects of a fixed cross-sectional profile. This is accomplished by pushing or drawing a material through a die of the desired cross-section for the end product. Generally, in the extrusion process, thermoplastic resin and plasticizers, including any of those resins and plasticizers described above, are pre-mixed and fed into an extruder device. Additives such as anti-blocking agents, colorants and UV inhibitors (in liquid, powder, or pellet form) are often used and can be mixed into the thermoplastic resin or plasticizer prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product (or photovoltaic module).

In the extruder device, the particles of the thermoplastic raw material and plasticizers, including any of those resin, plasticizer(s), and other additives described above, are further mixed and melted, resulting in a melt that is generally uniform in temperature and composition. Once the melt reaches the end of the extruder device, the melt is propelled into the extruder die. The extruder die is the component of the thermoplastic extrusion process which gives the final polymer interlayer sheet product its profile. Generally, the die is designed such that the melt evenly flows from a cylindrical profile coming out of the die and into the product's end profile shape. A plurality of shapes can be imparted to the end polymer interlayer sheet by the die so long as a continuous profile is present.

Notably, for the purposes of this application, the polymer interlayer at the state after the extrusion die forms the melt into a continuous profile will be referred to as a "polymer melt sheet." At this stage in the process, the extrusion die has imparted a particular profile shape to the thermoplastic resin, thus creating the polymer melt sheet. The polymer melt sheet is highly viscous throughout and in a generally molten state. In the polymer melt sheet, the melt has not yet been cooled to a temperature at which the sheet generally completely "sets." Thus, after the polymer melt sheet leaves the extrusion die, generally the next step in presently employed thermoplastic extrusion processes is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In contrast to the polymer melt sheet, this polymer interlayer sheet is not in a molten state and is not highly viscous. Rather, it is the set final form cooled polymer interlayer sheet product. For the purposes of this application, this set and cooled polymer interlayer will be referred to as the "polymer interlayer sheet".

In some embodiments of the extrusion process, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

Generally, the thickness, or gauge, of the polymer interlayer sheet will be in a range from about 15 mils to 60 mils (about 0.38 mm to about 1.52 mm), about 20 mils to about 50 mils (about 0.51 to 1.27 mm), and about 15 mils to about 35 mils (about 0.375 to about 0.89 mm). In multilayer interlayers, each of the skin and core layers of the multilayer interlayer may have a thickness of about 1 mil to 59 mils (about 0.025 to 1.50 mm), 1 mil to about 29 mils (about 0.025 to 0.74 mm), or about 2 mils to about 28 mils (about 0.05 to 0.71 mm). In other applications, the thickness, or gauge, of the polymer interlayer sheet can be greater than 60 mils (1.50 mm) as desired for the particular application.

As noted above, the interlayers of the present disclosure may be used as a single-layer sheet or a multilayered sheet. In various embodiments, the interlayers of the present disclosure (either as a single-layer sheet or as a multilayered sheet) can be incorporated into a multiple layer panel.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)/(polymer interlayer sheet)//(polymer film), where the polymer interlayer sheet can comprise multiple interlayers, as noted above, and wherein at least one of the interlayers comprises a PVB sheet made by the method of the invention. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film. Generally, as used herein, a polymer film is thinner than a polymer sheet, such as from about 0.001 to 0.2 mm thick.

Further, the multiple layer panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as: (glass)//(polymer interlayer)//(photovoltaic cell)//(polymer interlayer)//(glass or polymer film).

The interlayers of the present disclosure will most commonly be utilized in multiple layer panels comprising two substrates, preferably a pair of glass sheets, with the interlayers disposed between the two substrates. An example of such a construct would be: (glass)//(polymer interlayer sheet)//(glass), where the polymer interlayer sheet can comprise multilayered interlayers, as noted above, and wherein at least one of the interlayers comprises a PVB sheet made by the method of the invention. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

Other means for use in de-airing of the interlayer-glass interfaces (steps 2 to 5) known in the art and that are commercially practiced include vacuum bag and vacuum ring processes in which a vacuum is utilized to remove the air.

In the interlayers or sheets of the present invention, the molecular weight profile of the PVB resin can be controlled and a resultant extruded PVB sheet can be provided with a selected melt viscosity by supplying an appropriate amount of hydrogen peroxide during the melt blending based on the initial molecular weight (Mw) of the underlying PVB resin and the desired Mw of the resultant PVB sheet.

In addition to the inclusion of hydrogen peroxide in the melt blend allowing for "tunability" of the resultant molecular weight of the extruded PVB resin, it has also been found that the resultant PVB sheet avoids some of the problems of PVB sheets where the flowability (melt viscosity) is tuned or varied by including multiple different PVB resins or resin blending. Specifically, the PVB sheet gains flowability with a reduced surface roughness compared to PVB sheets made using multiple different PVB resins which are often significantly rougher. For example, inclusion of hydrogen peroxide in a melt blend with a PVB resin that would typically produce a PVB sheet with surface roughness Rz of about 70 to about 80 μm can reduce the surface roughness to below 10 μm, while blending other PVB resins with the same PVB resin that would produce a PVB sheet having a surface roughness of about 70 to about 80 μm but leaving out the hydrogen peroxide would typically only reduce the roughness to about 20 to about 50 μm. The reduced surface roughness in PVB sheets formed from PVB resins with hydrogen peroxide added during melt blending can often be used to reduce the level of mottle in some multilayer interlayers.

While the present disclosure contemplates hydrogen peroxide being used to increase flowability, it should be noted that organic peroxides have traditionally been used as cross-linking agents in polymer production (e.g. cross-linked EVA and polyethylene) to increase stiffness and decrease flowability in materials that traditionally have had too high a flowability. However, as discussed in this disclosure, it has been determined that hydrogen peroxide works differently and actually increases flowability in PVB, rather than decreasing the flowability as might be expected. This result is surprising because it would be expected that the hydrogen peroxide would act as a cross-linker in the PVB. Instead, without being limited to any particular theory of operation, the hydrogen peroxide appears to induce oxidative chain scission at normal PVB extrusion temperatures (e.g. about 170° to about 200° C.) rather than acting as a cross-linker.

Also, hydrogen peroxide, when used at the high temperatures normally associated with polymer extrusion, would be expected to have no effect on the PVB sheet because it would be expected to quickly decompose completely in the very beginning of the extrusion at extrusion temperatures. This latter indication is also believed to provide extruded PVB sheet including minimal, if any, amounts of leftover hydrogen peroxide. Thus, the inclusion of hydrogen peroxide in the PVB melt blend would not be expected to alter the resultant chemical composition of the PVB in any significant way.

Figure 2:
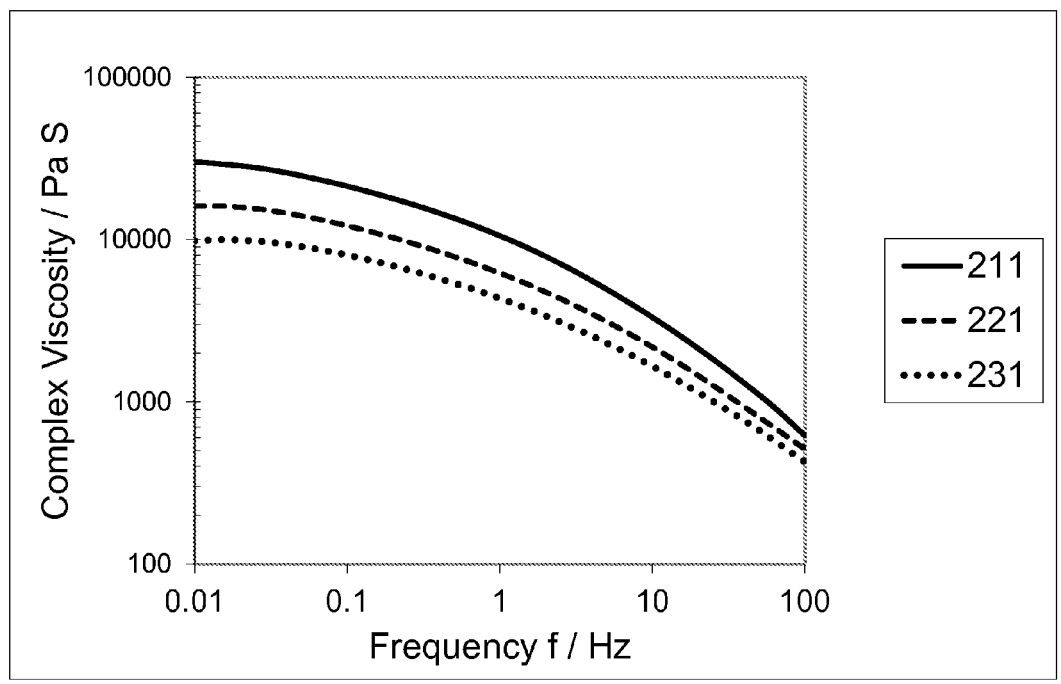
FIG. 2 is a graph showing the melt viscosity of three different PVB formulations.

With reference to FIGS. 1 and 2 there is described herein various PVB formulations which can be used to control melt viscosity of an extruded PVB resin. To generate these graphs of FIGS. 1 and 2, 100 parts of PVB resin (such as may be derived from PVOH having a degree of polymerization (DP) of about 1700) was melt blended with 38 phr of plasticizer (S-2075 available from Solutia Inc., a wholly owned subsidiary Eastman Chemical Company) and 0 to 2 phr of hydrogen peroxide at 170° C. in a Brabender® mixer for 7 minutes to form a melt cake. The melt cake was then compressed at 170° C. into a sheet sample. Molecular weight was then determined experimentally.

Melt viscosity of PVB sheet samples was measured with a parallel plate rheometer from Anton Paar. The sheet sample was placed between two parallel plates of the rheometer, and then subjected to the oscillation deformation under shear stress. The oscillation frequency increased stepwise from 0.01 Hz to 100 Hz frequency (frequency sweep) and the melt viscosity at each frequency step was recorded at 180° C. Molecular weight and molecular weight distribution of the sheet samples were calculated from such frequency sweep rheological data.

FIG. 1 is a graph illustrating four different PVB resin formulations. Lines (101) and (111) represent PVB sheets formed using traditional PVB resins with no hydrogen peroxide added to the melt blend. Line (101) shows a standard commercially available PVB resin with the following properties: weight average molecular weight (Mw)=135 Kg/mol, and polydispersity index (PDI)=2.1 that has been formed into a sheet. Line (111) comprises the control PVB sheet prepared in accordance with the above method except that no hydrogen peroxide was added to the composition. This same PVB resin used in the sheet of line (111) was used in the formation of the PVB sheets of the invention by melt blending the PVB resin and hydrogen peroxide. As such, the sheet of line (111) provides a baseline for the testing.

As previously discussed, the inclusion of hydrogen peroxide into a PVB composition allows for alteration of relative melt viscosity. Stated differently, inclusion of hydrogen peroxide helps to alter the relative melt viscosity of the PVB in which it is included, but it does not allow creation of an absolute or specific melt viscosity because it is dependent upon the properties of the starting PVB with which it is blended. Therefore it is desirable to provide a control sample to show the specific effects that the hydrogen peroxide has on that particular melt blend of PVB. The control resin PVB sheet shown by line (111) has the following properties: Mw=110 Kg/mol; and PDI=1.9. Line (111), while of slightly different shape than line (101), still shows the same qualities as the sheet formed from a commercially available PVB resin (shown by line (101)), indicating that the control PVB sheet blend is a viable formulation with a molecular weight distribution as expected.

Lines (121) and (131) show the molecular weight distribution of PVB sheets formed from the PVB resin of sheet (111) with the addition of hydrogen peroxide added in the melt blend. Specifically, line (121) represents a resin which included 1 phr of hydrogen peroxide in the melt blend and line (131) represents a resin which includes 2 phr of hydrogen peroxide in the melt blend. Each of these lines shows a clear flattening of the peak and a shift of the peak to the left. This is confirmed numerically as the resin used in the sheet of line (121) has the following properties: Mw=88 Kg/mol; and PDI=2.3 and the resin used in the sheet of line (131) has the following properties: Mw=78 Kg/mol; and PDI=2.3. The addition of hydrogen peroxide to PVB by melt blending the PVB resin and hydrogen peroxide shows a general lowering of the average (mean) molecular weight as well as a broader distribution of different molecular weights about the mean through incorporation of hydrogen peroxide into the formulations.

FIG. 2 provides a graph showing the melt viscosity of the three different PVB sheets of FIG. 1: the control PVB sheet (line 111) and the two PVB sheets including hydrogen peroxide (lines (121) and (131)). The commercially available resin of line (111) is not shown. Line (211) shows the melt viscosity of the control PVB resin sheet (Line (111) of FIG. 1) and clearly demonstrates a higher melt viscosity at all frequencies compared to the samples having hydrogen peroxide that were tested. Line (221) shows the melt viscosity of the formulation utilizing 1 phr of hydrogen peroxide (the PVB sheet material of line (121)), and line (231) shows the formulation with 2 phr of hydrogen peroxide (the PVB sheet material of line (131)). As should be apparent from FIG. 2, the melt viscosity of the formulations comprising hydrogen peroxide that was melt blended with PVB shows a consistent decrease across all frequencies. This decrease in melt viscosity is the result of lowering the molecular weight of the PVB resin used in the PVB sheets as the amount of hydrogen peroxide is increased.

In summary, the above discussion makes it clear that hydrogen peroxide can be included in a melt blend of PVB to lower the average molecular weight of PVB resin and, thus, melt viscosity, resulting in a PVB sheet showing improved and beneficial properties, specifically, increased flowability, compared to the same PVB sheet manufactured without use of hydrogen peroxide in the melt blend. While the above shows various particular formulations which can provide for particular benefits due to a lower melt viscosity, it should be recognized that, in an embodiment, as the hydrogen peroxide can be used to broaden the molecular weight distribution of a resultant PVB sheet from any initial PVB starting resin other properties may be obtained in addition or as well. Specifically, if one was to take a particular starting molecular weight PVB resin having a particular molecular weight distribution, that distribution can be broadened through the inclusion of hydrogen peroxide at the melt (extrusion) stage.

The invention also includes the following Embodiments 1 to 12, as set forth below.

Embodiment 1 is a method for making a poly(vinyl butyral) sheet, the method comprising: providing a first poly(vinyl butyral) resin in a first amount; providing a first plasticizer in a second amount; melt blending said first amount of said first poly(vinyl butyral) resin with said second amount of said first plasticizer and a third amount of a hydrogen peroxide to create a poly(vinyl butyral) melt blend; and extruding said poly(vinyl butyral) melt blend into a poly(vinyl butyral) sheet; wherein said poly(vinyl butyral) sheet has a lower melt viscosity compared to a poly(vinyl butyral) sheet formed by melt blending said first amount of said first poly(vinyl butyral) resin with said second amount of said first plasticizer without any hydrogen peroxide.

Embodiment 2 is a method for making a poly(vinyl butyral) sheet that includes the features of Embodiment 1, which further comprises adding a second poly(vinyl butyral) resin to said melt blend in a fourth amount.

Embodiment 3 is a method for making a poly(vinyl butyral) sheet that includes the features of any of Embodiments 1 or 2, wherein said third amount comprises about 0.1 to about 3 parts per hundred weight resin of a hydrogen peroxide.

Embodiment 4 is method for making a poly(vinyl butyral) sheet that includes the features of any of Embodiments 1 to 3, wherein said third amount comprises about 0.5 to about 2.5 parts per hundred weight resin of a hydrogen peroxide.

Embodiment 5 is a method for making a poly(vinyl butyral) sheet that includes the features of any of Embodiments 1 to 4, wherein said third amount comprises about 1 to about 2 parts per hundred weight resin of a hydrogen peroxide.

Embodiment 6 is poly(vinyl butyral) melt blend comprising: a poly(vinyl butyral) resin; a plasticizer; and hydrogen peroxide.

Embodiment 7 is a poly(vinyl butyral) melt blend that includes the features of Embodiment 6, wherein the poly(vinyl butyral) melt blend is extruded to form a poly(vinyl butyral) sheet.

Embodiment 8 is a poly(vinyl butyral) melt blend that includes the features of any of Embodiment 6 or 7, comprising about 0.1 to about 3 parts per hundred weight resin of hydrogen peroxide.

Embodiment 9 is a poly(vinyl butyral) melt blend that includes the features of any of Embodiments 6 to 8, comprising about 0.5 to about 2.5 parts per hundred weight resin of hydrogen peroxide.

Embodiment 10 is a poly(vinyl butyral) melt blend that includes the features of any of Embodiments 6 to 9, comprising about 1 to about 2 parts per hundred weight resin of hydrogen peroxide.

Embodiment 11 is a poly(vinyl butyral) sheet produced by the method of any of Embodiments 1 to 5.

Embodiment 12 is a poly(vinyl butyral) sheet that includes the features of Embodiment 11, wherein the poly(vinyl butyral) melt blend consists essentially of poly(vinyl butyral) resin, plasticizer and hydrogen peroxide.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

The invention claimed is:

1. A method for making a poly(vinyl butyral) sheet, the method comprising:
   providing a first poly(vinyl butyral) resin in a first amount;
   providing a first plasticizer in a second amount;
   melt blending said first amount of said first poly(vinyl butyral) resin with said second amount of said first plasticizer and a third amount of a hydrogen peroxide to create a poly(vinyl butyral) melt blend; and
   extruding said poly(vinyl butyral) melt blend into a poly(vinyl butyral) sheet;
   wherein said poly(vinyl butyral) sheet has a lower melt viscosity compared to a poly(vinyl butyral) sheet formed by melt blending said first amount of said first poly(vinyl butyral) resin with said second amount of said first plasticizer without any hydrogen peroxide.

2. The method of claim 1 further comprising adding a second poly(vinyl butyral) resin to said melt blend in a fourth amount.

3. The method of claim 1 wherein said third amount comprises about 0.1 to about 3 parts per hundred parts by weight of resin.

4. The method of claim 1 wherein said third amount comprises about 0.5 to about 2.5 parts per hundred parts by weight of resin.

5. The method of claim 1 wherein said third amount comprises about 1 to about 2 parts per hundred parts by weight of resin.

6. A poly(vinyl butyral) melt blend comprising:
   a poly(vinyl butyral) resin;
   a plasticizer; and
   hydrogen peroxide.

7. The poly(vinyl butyral) melt blend of claim 6, wherein the poly(vinyl butyral) melt blend is extruded to form a poly(vinyl butyral) sheet.

8. The poly(vinyl butyral) melt blend of claim 6, comprising about 0.1 to about 3 parts per hundred parts by weight of resin of hydrogen peroxide.

9. The poly(vinyl butyral) melt blend of claim 6, comprising about 0.5 to about 2.5 parts per hundred parts by weight of resin of hydrogen peroxide.

10. The poly(vinyl butyral) melt blend of claim 6, comprising about 1 to about 2 parts per hundred parts by weight of resin of hydrogen peroxide.

11. A poly(vinyl butyral) sheet produced by the following method:
    providing a first poly(vinyl butyral) resin in a first amount;
    providing a first plasticizer in a second amount;
    melt blending said first amount of said first poly(vinyl butyral) resin with said second amount of said first plasticizer and a third amount of a hydrogen peroxide to create a poly(vinyl butyral) melt blend; and
    extruding said poly(vinyl butyral) melt blend into a poly(vinyl butyral) sheet.

12. The poly(vinyl butyral) sheet of claim 11, wherein the amount of hydrogen peroxide is from about 0.1 to about 3 parts per hundred parts by weight of resin.

13. The poly(vinyl butyral) sheet of claim 11, wherein the amount of hydrogen peroxide is from about 0.5 to about 2.5 parts per hundred parts by weight of resin.

14. The poly(vinyl butyral) sheet of claim 11, wherein the amount of hydrogen peroxide is from about 1 to about 2 parts per hundred parts by weight of resin.

15. The poly(vinyl butyral) sheet of claim 11, wherein the poly(vinyl butyral) melt blend consists essentially of poly(vinyl butyral) resin, plasticizer and hydrogen peroxide.

* * * * *